United States Patent [19]
Woolston

[11] 4,095,511
[45] Jun. 20, 1978

[54] SET-UP CONTROL

[75] Inventor: Allan Brent Woolston, Wynnewood, Pa.

[73] Assignee: Molins Machine Company, Inc., Cherry Hill, N.J.

[21] Appl. No.: 809,147

[22] Filed: Jun. 21, 1977

Related U.S. Application Data

[63] Continuation of Ser. No. 696,670, Jun. 16, 1976, abandoned.

[51] Int. Cl.² .............................................. B31B 1/20
[52] U.S. Cl. .................... 93/58.2 R; 83/499
[58] Field of Search ............ 93/58.2 R, 58.2 F, 58 R, 93/58.1; 83/4, 498, 499, 501, 504–506

[56] References Cited

U.S. PATENT DOCUMENTS

| | | | |
|---|---|---|---|
| 3,646,418 | 2/1972 | Sterns et al. | 83/4 X |
| 3,651,723 | 3/1972 | Gallagher, Jr. et al. | 83/499 X |
| 3,786,705 | 1/1974 | Dorfel | 83/504 X |
| 3,929,047 | 12/1975 | Brandl | 93/58.2 R X |
| 3,952,637 | 4/1976 | Lambert et al. | 93/58.2 R |
| 4,010,677 | 3/1977 | Hirakawa et al. | 83/499 X |

*Primary Examiner*—James F. Coan
*Attorney, Agent, or Firm*—Seidel, Gonda & Goldhammer

[57] ABSTRACT

Lateral and rotary axis controls for automatically setting up the position of a rotary element mounted on a rotatable shaft in a box-making machine. The lateral position of the element determines the position of the creases and slots in a box blank. The rotary position of the element determines the depth of the slots in the blank.

8 Claims, 8 Drawing Figures

FIG. 3
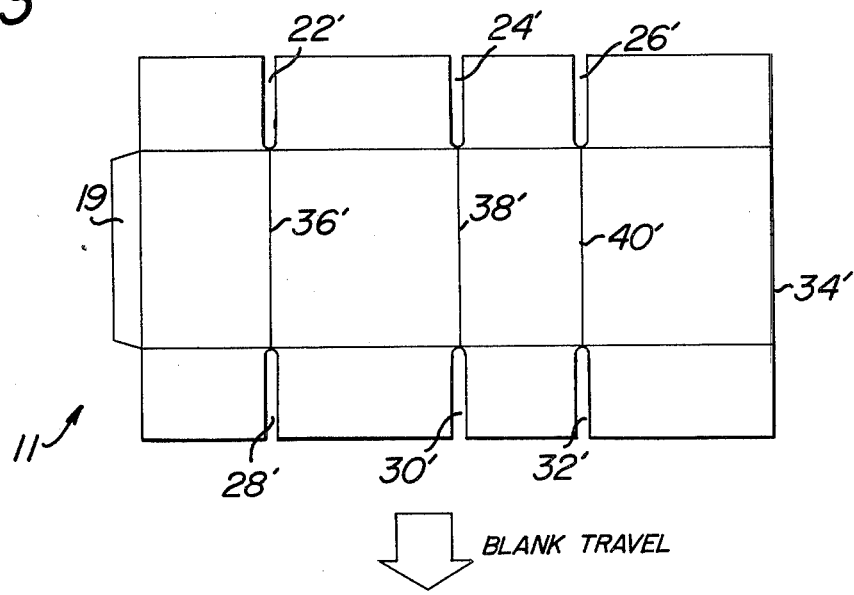
BLANK TRAVEL
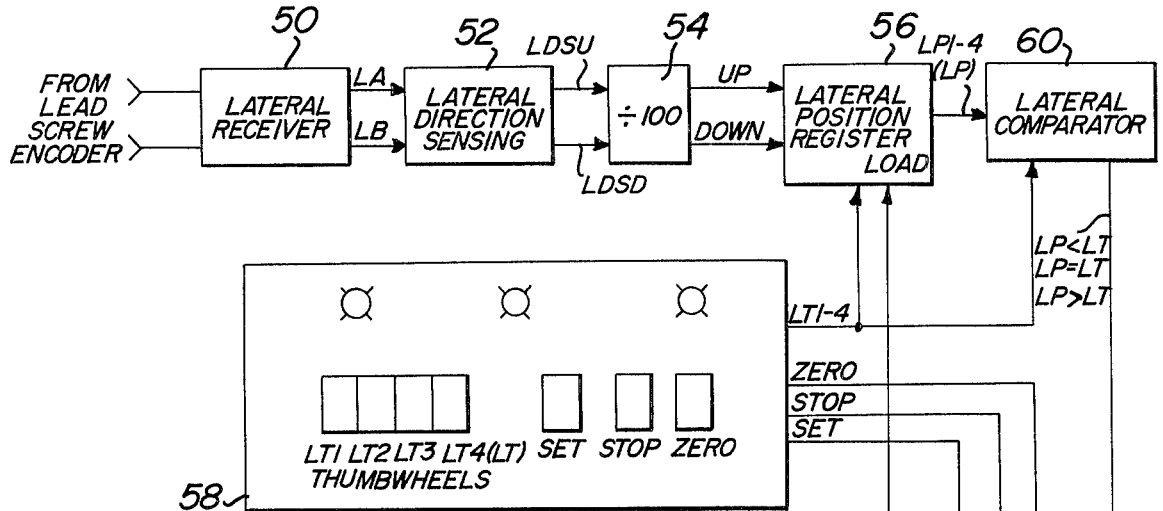
FIG. 4
LATERAL AXIS CONTROL
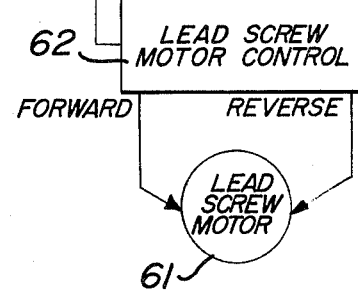

FIG. 5 LATERAL DIRECTION SENSING

FIG. 6 LEAD SCREW MOTOR CONTROL

ROTARY AXIS CONTROL

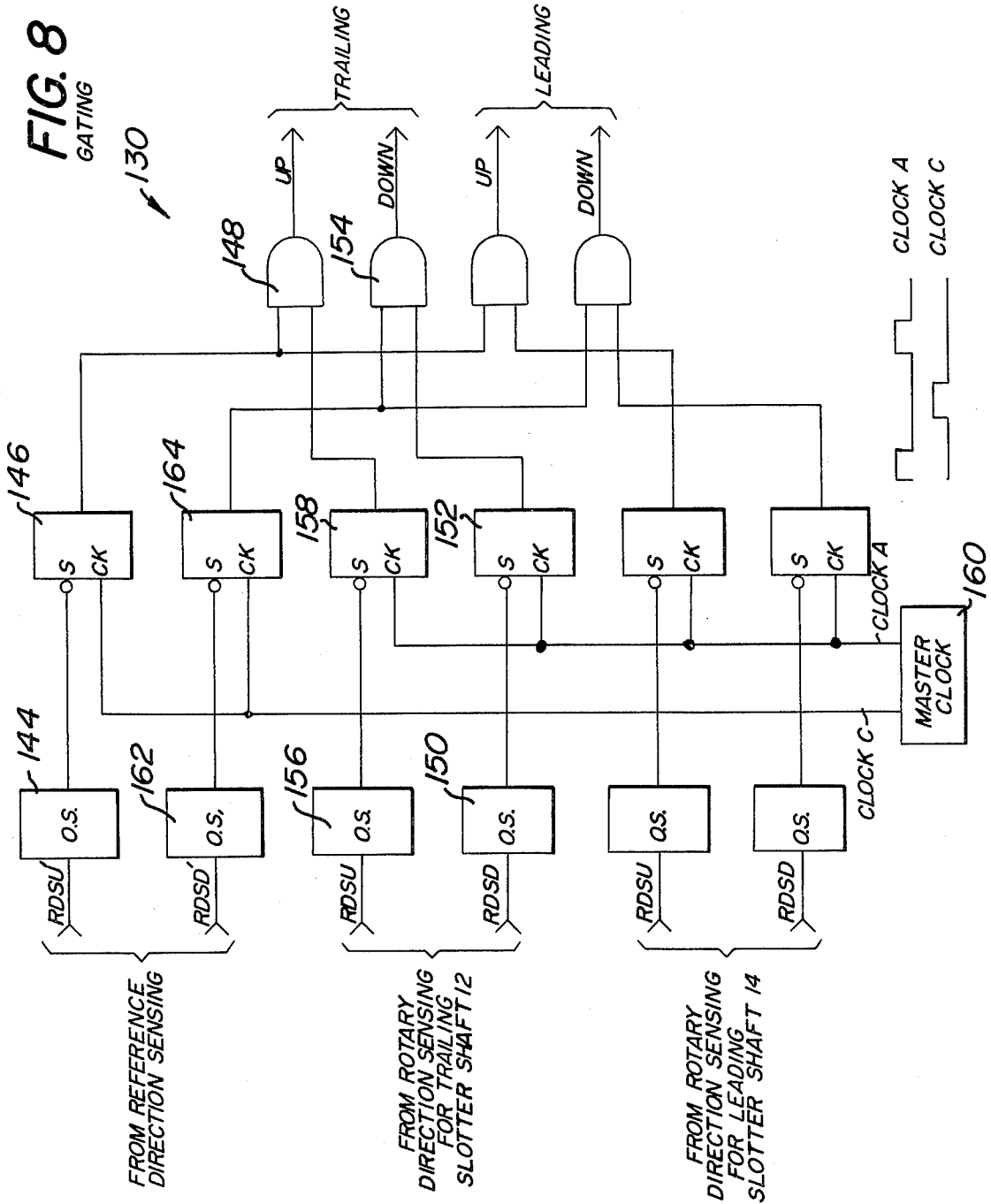

SET-UP CONTROL

This is a continuation application Ser. No. 696,670, filed June 16, 1976.

BACKGROUND OF THE INVENTION

The present invention is directed to a set-up control for a box-making machine which slots, scores and folds a box blank into a collapsed-glued box. In particular, the invention is directed to lateral and rotary axis controls for setting up the rotary elements on a slotter shaft or the like in a box-making machine. Such a box-making machine is described in U.S. Pat. No. 3,371,585.

In manufacturing a collapsed-glued box from a box blank, transversely scored box blanks are stacked on a feed table. A reciprocating kicker bar pushes the bottom blank from the stack into a pair of feed rolls. The rolls grip the blank and feed it to a print section. A printing die mounted on a rotating cylinder prints a surface of the blank as it passes through the print section. Pull rolls grip the blank as it passes through the section and feed it to the next print section. The blank is then passed to a slotter-creaser section.

In the slotter-creaser section, a pair of glue tab elements cut away a portion of the blank to form a glue tab. Slotter knife elements slot the blank at predetermined locations and depths for the box flaps. A trim knife element trims the edge of the blank to assure a uniform gap at the box joint. Creaser elements located between juxtaposed slotter elements crease the blank in line with the slots.

Adhesive is applied to the glue tab and the blank is folded thereafter in a folding section. Folding takes place along the crease lines.

The sections of the machine are movable along hardened tracks to permit operator access to the rotary elements during set-up. Typically, the elements are manually set-up by the operator along lateral and rotary axes to ensure that the box blank is cut, slotted and creased at preselected locations on the blank and for preselected depths.

Control of the position of an element along the longitudinal axis of its associated shaft is termed lateral axis control. Control of an element by rotating it with its associated shaft is termed rotary axis control. Slotter knife elements and creaser elements are moved laterally along associated shafts so that the blank is slotted and creased at the preselected locations. In addition, each slotter knife is rotated with its associated shaft to adjust the depth of the slot in the blank.

Previously, each element was displaced laterally or rotationally to a desired position by manually positioning each element. This required the machine to be stopped and the operator to separate and obtain access to the internal components of the machine sections. The rotary elements were then manually displaced to their desired positions without accounting for backlash or coasting time of the control drive.

Various machines for positioning operating elements in web slitting applications are also disclosed in U.S. Pat. Nos. 3,646,418, 3,786,705, 3,886,833 and 3,952,637.

An advantage of the present invention is that the rotary element can be automatically positioned along lateral and rotary axes without having to separate the sections of the machine for purposes of access by the operator.

Another advantage of the invention is that the rotary elements can be set up without exposing the operator to hazards and without having to shut the machine down.

Another advantage of the invention is that the rotary elements can be set up with automatic compensation of backlash and coasting time.

A further advantage of the invention is that it is accurate and reliable.

Other advantages appear hereinafter.

BRIEF SUMMARY OF THE INVENTION

Apparatus for processing a moving box blank including a rotatable shaft having a plurality of rotary elements mounted thereon at least one of which is mounted for lateral and rotary movement on the shaft, comprising lateral axis and rotary axis controls. The lateral axis control comprises means for generating a digital set point signal indicative of a desired lateral position of the rotary element on the shaft; means for tracking the actual lateral position of the rotary element on the shaft and for generating a digital signal indicative thereof; means for comparing the actual position signal to the set point signal and for generating an error signal indicative of the sense of the difference between the actual position and set point signals; and control means for moving the rotary element along the shaft to the desired lateral position in response to the error signal. The rotary axis control means includes means for generating a digital set point signal indicative of a desired rotary position of the rotary element on the shaft; means for generating a digital signal indicative of the location of the box blank relative to the rotary position of the rotary element on the shaft; means for tracking the actual rotary position of the rotary element on the shaft and for generating a digital signal indicative thereof; means for comparing the actual position signal to the set point signal and for generating an error signal indicative of the sense of the difference between the actual position and set point signals; and control means for moving the rotary element to the desired rotary position in response to the error signal.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 3 is a plan view of a finished box blank.

FIG. 4 is a block diagram of the lateral axis control.

FIG. 8 is a logic diagram of the gating circuit in the rotary axis control.

DETAILED DESCRIPTION OF THE INVENTION

Figure 1:
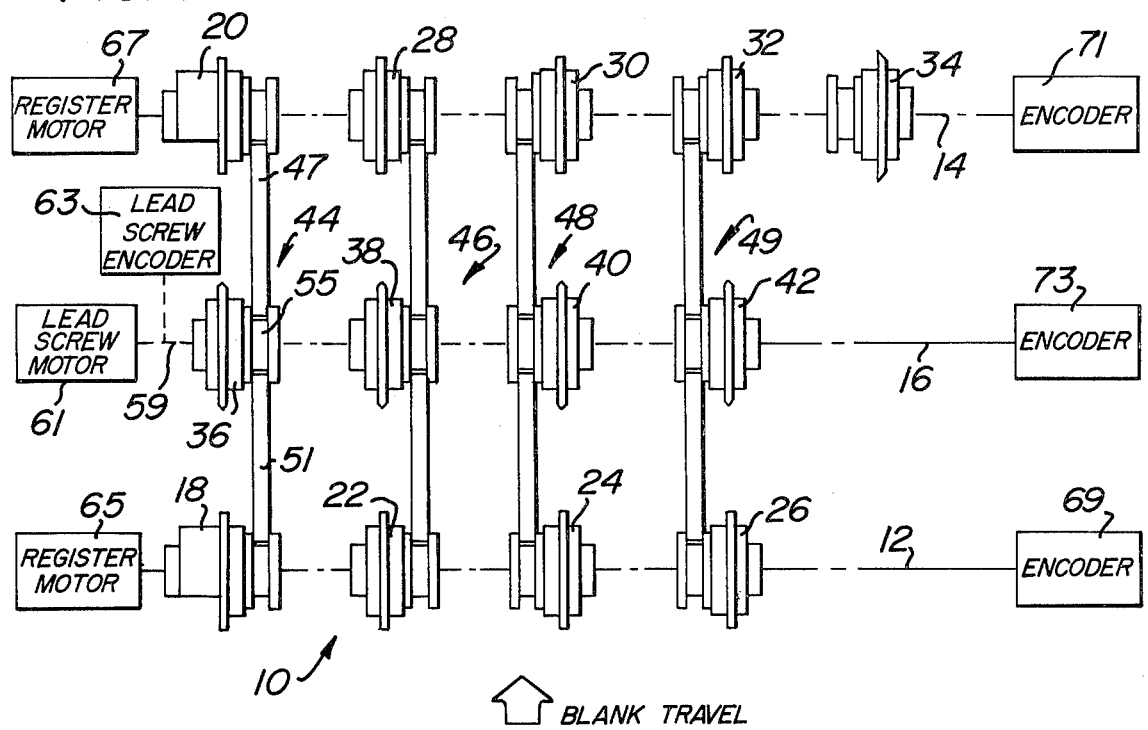
FIG. 1 is a plan view of the slotter-creaser section of a box-making machine.

Referring to the drawings in detail, wherein like numerals indicate like elements, there is shown in FIG. 1 a slotter-creaser section of a box-making machine, designated generally as 10.

The slotter-creaser section 10 includes trailing slotter shaft 12 and leading slotter shaft 14. A creaser shaft 16 is located between the slotter shafts. Glue tab elements 18 and 20 are mounted on slotter shafts 12 and 14 respectively for rotation therewith. Slotter knife elements 22, 24 and 26 are mounted on trailing slotter shaft 12 for rotation therewith. Slotter knife elements 28, 30 and 32 are mounted on leading slotter shaft 14 for rotation therewith. Each of the slotter knife elements 22, 24, 26, 28, 30 and 32 is provided with a knife for forming a slot in a fix blank. A trim knife element 34 is mounted on the leading slotter shaft for rotation therewith. Creaser elements 36, 38, 40 and 42 are mounted on creaser shaft 16 for rotation therewith. Each of the creaser elements is yoked to associated elements on the slotter shaft by power yokes 44, 46, 48 and 49.

Slotter knife elements 22-32 form a plurality of slots in a box blank 11. See FIG. 3. Slotter knife elements 22, 24 and 26 form slots 22', 24' and 26' at the trailing edge of the box blank. Slotter knife elements 28, 30 and 32 form slots 28', 30' and 32' in the leading edge of the box blank. Creaser elements 36, 38 and 40 form creases 36', 38' and 40' in the box blank. A glue tab 19 is formed in the box blank by glue tab elements 18 and 20. The box blank edge 34' is trimmed by trim knife element 34.

The function of each of the rotary elements described above is well known in the art, and further description herein is deemed unnecessary. Thus, the present invention is directed to control of the lateral and rotary positioning of the elements rather than the particular structure and function of the elements. For convenience sake, however, the structural configuration of the slotter and creaser shafts in the slotter-creaser section of a box-making machine is briefly described hereinafter.

Figure 2:
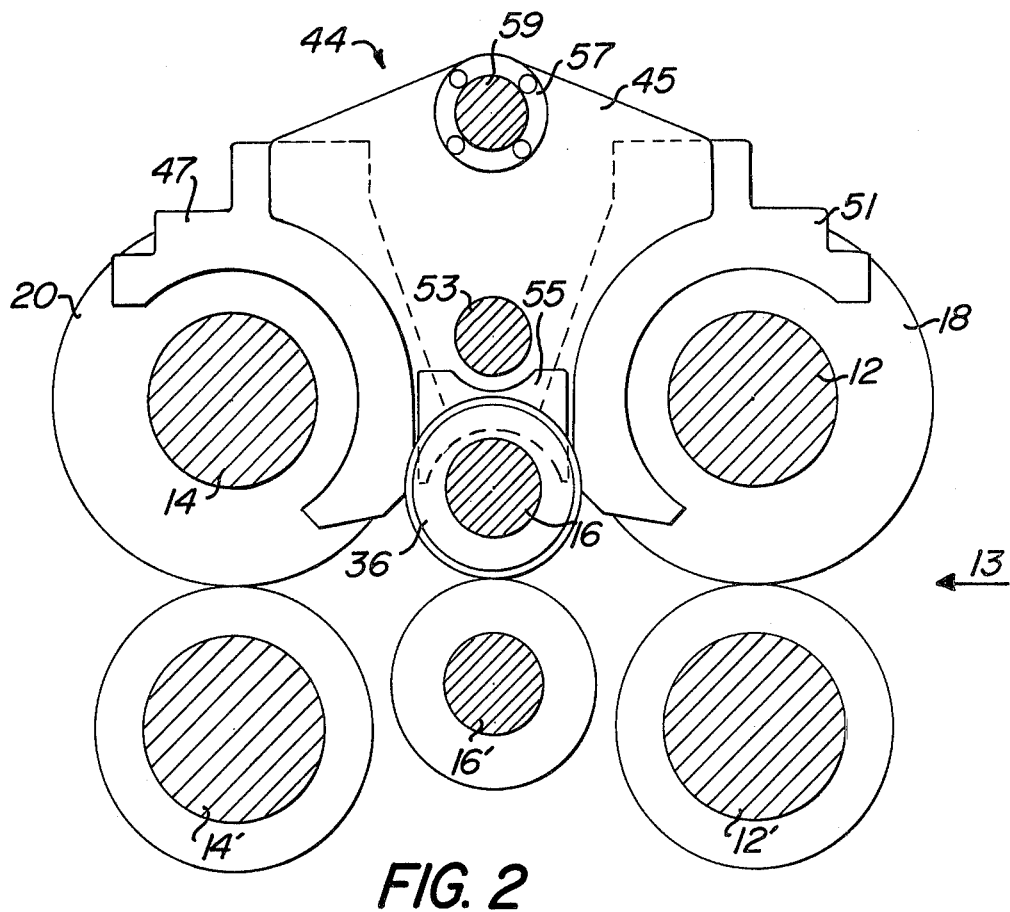
FIG. 2 is a cross-sectional view of the yoking of the slotter and creaser shafts.

Each of the shafts 12, 14 and 16 is associated with another shaft in juxtaposition therewith which carries a plurality of rotary elements which are the female counterparts of the glue tab elements, slotter knife elements, creaser elements and the trim knife element described. Above. Thus, the trailing slotter shaft 12 is associated with a slotter shaft 12', the creaser shaft 16 is associated with a creaser shaft 16', and the leading slotter shaft 14 is associated with a slotter shaft 14'. See FIG. 2. Each of the power yokes 44, 46, 48 and 49 couple a pair of leading and trailing slotter shaft elements to a creaser shaft element. For purposes of clarity, there is shown in FIG. 2 the structure of power yoke 44, it being understood that the structure of power yokes 46 and 49 are identical to that of yoke 44. Power yoke 48 is also of the same general structure but differs from the other yokes in that it is fixed in position whereas the other yokes are movable. Each of the power yokes 44, 46, 48 and 49 is associated with another power yoke (not shown) which couples the female rotary elements on shaft 12', 14' and 16' in like manner. The box blank moves through section 10 in the direction of arrow 13.

Power yoke 44 comprises a central body portion 45 to which are fastened, by means of bolts or the like, two plates 47 and 51. Plate 47 retains glue tab element 20 in position on shaft 14. Plate 51 retains glue tab element 18 in position on shaft 12. The central body portion 45 of yoke 44 is mounted for lateral motion on a guide shaft 53 passing therethrough to facilitate lateral displacement of the yoke parallel with the longitudinal axes of shafts 12, 14 and 16. A plate 55 is fastened to the central body portion 45 of yoke 44. Plate 55 retains creaser element 36 in position on shaft 16.

Lateral displacement of rotary elements 18, 20 and 36 on shafts 12, 14 and 16, respectively, is obtained by driving yoke 44 parallel to the shaft axes. For this purpose, yoke 44 is provided with a threaded nut 57 located in a passage in its central body portion. A lead screw 59 driven by a lead screw motor 61 is in threaded engagement with the threaded nut 57. See FIGS. 1 and 2. Rotation of the lead screw 59 by lead screw motor 61 causes lateral displacement of the yoke 44, and therefore the rotary elements 18, 20 and 36, along the longitudinal axes of shafts 12, 14 and 16. The direction of rotation of the lead screw 59 determines the direction of lateral displacement of the yoke 44.

Rotation of the lead screw 59 is detected by a lead screw encoder 63 which is mechanically coupled to the lead screw. See FIG. 1. Lead screw encoder 63 is an incremental optical shaft encoder with sealed bearings. The encoder has a two channel quadrature phase output with balanced-line transmission for each channel.

The slotter shafts 12 and 14 are driven in synchronism with the creaser shaft 16 by a main drive (not shown) as is well known in the art. Additionally, shafts 12 and 14 are coupled by means of differential gearing to conventional register motors 65 and 67, respectively. The rotary positions of the rotary elements on shafts 12 and 14 are adjustable by means of the register motors. Thus, the rotary postion of elements 18, 22, 24 and 26 may be adjusted by rotating slotter shaft 12 by means of the register motor 65, either when the shaft is stationary or when it is being driven during operation of the box-making machine. Similarly, the rotary position of elements 20, 28, 30 and 32 may be adjusted by rotating shaft 14 by means of register motor 67.

The rotation of shafts 12, 14 and 16 is detected respectively by trailing slotter shaft encoder 69, leading slotter shaft encoder 71 and creaser shaft encoder 73. Encoders 69, 71 and 73 are identical to lead screw encoder 63 and are mechanically coupled to their respective shafts such that the outputs of encoders 69, 71 and 73 per revolution of their associated shafts are identical.

It should be understood that each of the yokes 44, 46 and 49 are associated with separate lead screws, lead screw motors and encoders. Accordingly, each of the yokes is separately driven to set up its associated rotary elements. In the preferred embodiment described herein, yoke 48 is not driven by a lead screw, that is, the yoke is stationary. Accordingly, rotary elements 24, 30 and 40 remain fixed in position on shafts 12, 14 and 16, respectively, although the elements rotate with the shafts. The lateral axis controls for yokes 44, 46 and 49 are identical, and the rotary axis controls for shafts 12 and 14 are identical, as will be described hereinafter.

It should also be understood that it is conventional to provide shafts 12 and 14 with longitudinal keys to restrict rotary movement but permit lateral movement of the elements mounted thereon.

LATERAL AXIS CONTROL

Identical lateral axis controls are used for each of the power yokes 44, 46 and 49. A lateral axis control which can be used for each yoke is shown in FIG. 4. In describing the operation of the lateral axis control, reference is made herein to lead screw 59, lead screw motor 61 and lead screw encoder 63. It should be understood, however, that identical lateral axis controls are used to position yokes 46 and 49 in association with their respective lead screws, lead screw motors and lead screw encoders.

The lateral position of the yoke is indicated by the output of encoder 63. The encoder output is detected by a lateral receiver 50 which is a differential receiver having two balanced quadrature phase channel inputs. See FIG. 4. Balanced line transmission is used to enable reception of low-level signals in the presence of relatively high noise. The lateral receiver outputs are designated LA and LB. The direction of rotation of the lead screw is sensed by lateral direction sensing circuit 52. The outputs of lateral direction sensing circuit 52 are designated LDSU and LDSD. The pulse repetition frequency of the LDSU and LDSD signals is divided by a factor of 100 by frequency divider circuit 54 and transmitted to lateral position register 56.

The lateral position register 56 serves as a temporary storage device for the actual lateral position of the yoke and the rotary elements associated therewith. The lateral position register is preset to the zero or initial position of the element by means of thumb wheel switches LT1-4 on control panel 58. The outputs of the lateral position register, designated LP1-4, indicate the actual or dynamic lateral position of the element on the associated slotter or creaser shaft. The outputs of lateral position register 56 are continuously compared to the thumb wheel signals LT1-4 by lateral comparator 60. Equality and inequality of the lateral position register and thumb wheel signals is indicated by the lateral comparator outputs LP < LT, LP = LT and LP > LT (the "lateral comparator equality signals").

A lead screw motor control circuit 62 drives the lead screw motor 61 in the forward or reverse directions in response to the lateral comparator equality signals and operation of the Set, Stop and Zero switches on control panel 58.

Figure 6:
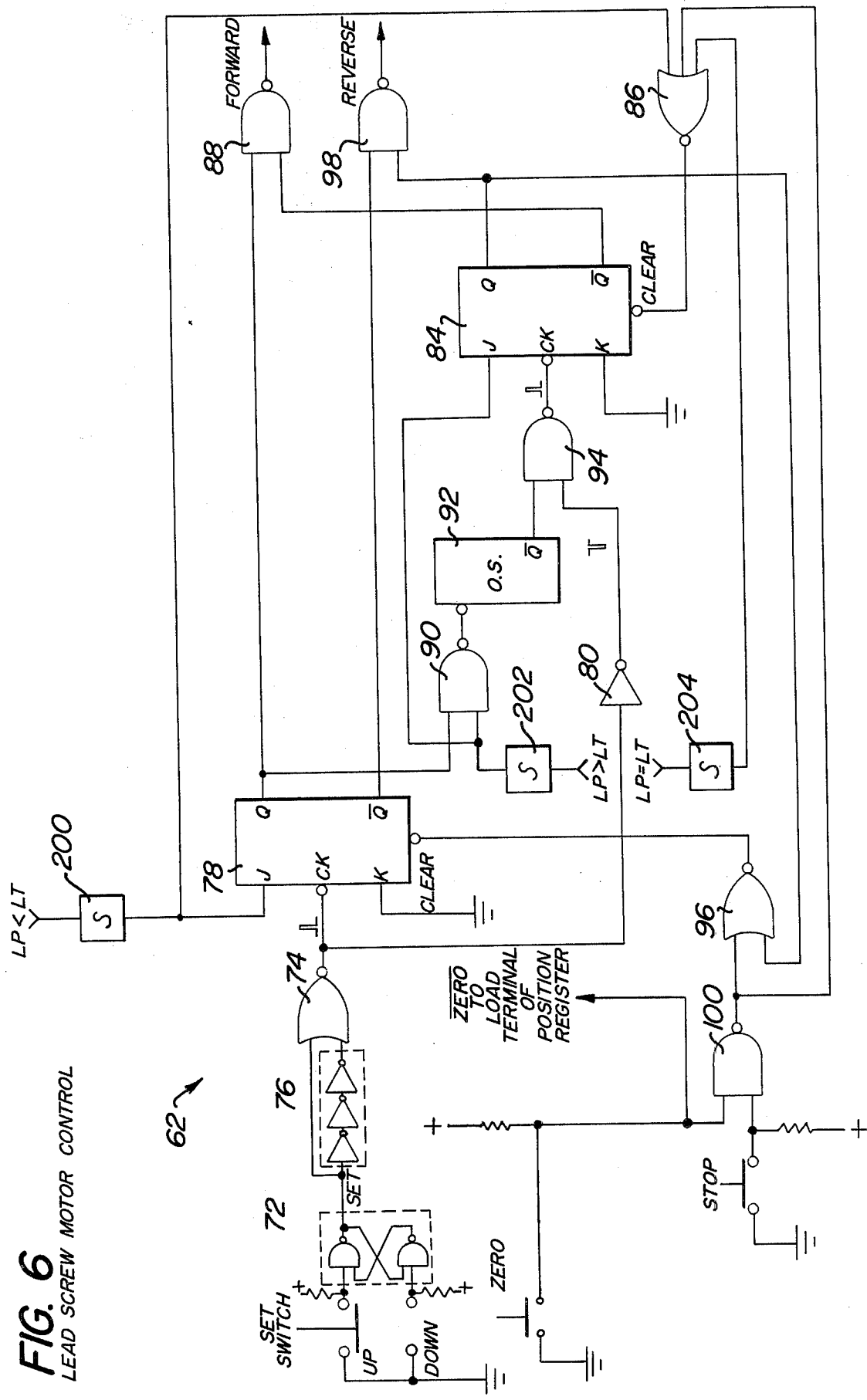
FIG. 6 is a logic diagram of the lead screw motor control.

To zero the lateral axis control, the operator sets the thumb wheel switch LT1-1 to the observed initial lateral position of the elements 18, 20 and 36 and depresses the Zero pushbutton on control panel 58. The Zero pushbutton is a momentary contact switch which is grounded when depressed. See FIG. 6. The grounded condition of the Zero switch is indicated by the $\overline{\text{Zero}}$ signal at the input of NAND gate 100. The $\overline{\text{Zero}}$ signal is transmitted to the Load terminal of the lateral position register. See FIGS. 4 and 6. This causes the lateral position register to be preset to the thumb wheel switch signals LT1-4. Thereafter, the lateral axis control will operate to maintain the elements at the zeroed position.

If the initial position of the elements is not the desired position, the operator merely sets the thumb wheel switch to the desired or set point position and presses the Set pushbutton. The lateral axis control will automatically position the elements at the set point location by causing lead screw motor 61 to drive yoke 44.

The Set switch is a momentary contact switch, normally in the up position. See FIG. 6. When momentarily depressed to the down position, the switch causes latch circuit 72 to generate a negative going Set pulse. The Set pulse is fed directly to one input of NOR gate 74 and, indirectly through inverter and delay circuit 76, to the other input of the NOR gate. Inverter and delay circuit 76 comprises three series connected inverters having a total propagation delay of approximately 30 ns. The NOR gate 74 generates a positive going pulse of approximately 30 ns duration at the clock input of forward flip-flop 78. The positive going pulse is also inverted by inverter 80 and re-inverted and transmitted by NAND gate 94 to the clock input of reverse flip-flop 84. The lead screw motor control circuit 62 operates in either of two modes to laterally position the elements depending upon the initial sense of the difference between the initial lateral position of the elements and the set point position indicated by the thumb wheel setting, hereinafter referred to as "initial lateral position error."

If the initial lateral position error is negative, LP will be < LT. See FIG. 4. Accordingly, the LP < LT output of comparator 60 will be "high." The LP < LT output of the comparator is fed through an integrator 200 to the J input of flip-flop 78 and an input of NOR gate 86. When the LP < LT output of the comparator is "high," it keeps reverse flip-flop 84 cleared via NOR gate 86. The positive going pulse generated by NOR gate 74 clocks the forward flip-flop 78, causing the Q output of the flip-flop to go "high" in response to the "high" signal at the J input of the flip-flop. A NAND gate 88 detects the Q output of the flip-flop and generates a "low" forward signal to the lead screw motor 61. In particular, the forward signal is transmitted to a forward triac which controls the lead screw motor starter with respect to the forward direction of travel. The motor turns the lead screw 59 to re-position the elements to the desired or set point position indicated by the thumb wheel setting.

When the elements reach the set point position indicated by the thumb wheel setting, the lead screw motor continues to operate the lead screw, causing the elements to overshoot the set point position. As a result, the LP < LT output of comparator 60 goes "low" and the LP > LT output of the comparator goes "high." The LP > LT output of the comparator is fed through an integrator 202 to an input of NAND gate 90 and the J input of reverse flip-flop 84. When the LP > LT output of the comparator is "high," it causes NAND gate 90 to trigger an over-travel one shot 92. The over-travel one shot generates a negative going pulse which is inverted and transmitted by NAND gate 94 to the clock input of reverse flip-flop 84. The trailing edge of the pulse output of NAND gate 94 clocks the reverse flip-flop, causing the Q output of the flip-flop to go "high" in response to the "high" signal at the J input of the flip-flop. A NOR gate 96 detects the Q output of flip-flop 84 and clears the forward flip-flop 78, preventing NAND gate 88 from energizing the lead screw motor in the forward direction. At the same time, a NAND gate 98 generates a "low" output in response to the $\overline{\text{Q}}$ output of forward flip-flop 78 and the Q output of reverse flip-flop 84. The reverse signal output of NAND gate 98 is transmitted to a reverse triac which controls the lead screw motor starter with respect to the reverse direction of travel. In response, the lead screw motor turns the lead screw to reverse the travel of the elements, bringing the elements back towards the set point position.

When the elements reach the set point position in the reverse direction, the LP = LT output of comparator 60 goes "high." The LP = LT output of the comparator is fed through an integrator 204 to an input of NOR gate 86. When the LP = LT output of the comparator is "high" it causes NOR gate 86 to clear the reverse flip-flop 84. This prevents NAND gate 98 from energizing the lead screw motor in the reverse direction. At this point, the lead screw motor stops turning the lead screw, and the elements remain at the set point position.

If, on the other hand, the initial lateral position error is positive, the element is brought to the set point position without any over-travel. If the initial lateral position error is positive, the LP > LT output of comparator 60 will be "high" when the Set switch is momentarily depressed. The positive going pulse output of NOR gate 74 will be reflected through inverter 80 and NAND gate 94 to the clock input of the reverse flip-flop 84. The pulse output of NAND gate 94 clocks the reverse flip-flop, causing the Q output of the flip-flop to go "high" in response to the "high" signal at the J input of the flip-flop. NAND gate 98 therefore operates the lead screw motor in the reverse direction, causing the motor to bring the elements directly to the set point position without any overtravel. When the elements reach the set point position, the LP = LT output of comparator 60 causes the reverse flip-flop 84 to be cleared by means of NOR gate 86, and the elements remain at the set point position as previously described.

The purpose of the integrators 200, 202 and 204 is to eliminate short-term errors in the state of the comparator outputs caused by transient errors in the lateral position register count. It is well known that transient errors in the position register count are commonly encountered due to propagation delay through the register internal stages. The propagation delay may be 25 to 45 ns per stage. The integrators 200, 202 and 204 are interposed between the comparator and the associated components of lead screw motor control 62 to immunize the components from transient errors in the comparator outputs. Preferably, the integrators are identical, each comprising a simple RC integrating circuit series connected to two following Schmitt-Trigger inverters.

In view of the foregoing, it should be appreciated that the elements are always brought to rest at the set point position from the same direction, regardless of the sense of the initial lateral position error, by selectively driving the lead screw motor in the forward or reverse directions. The effect of backlash due to clearance between the threads of lead screw 59 and nut 57 therefore is kept substantially constant. Similarly, the effect of coasting due to lead screw motor inertia is kept substantially constant.

At any time during correction of the lateral position of the elements, the lead screw motor can be stopped by the operator. This is accomplished by merely depressing the Stop pushbutton on control panel 58. See FIG. 4. When the stop pushbutton is depressed, it causes NAND gate 100 to clear the forward flip-flop 78, by means of NOR gate 96, and the reverse flip-flop 84 by means of NOR gate 86. When both flip-flops are cleared, NAND gates 88 and 98 will be disabled, preventing operation of the lead screw motor. Accordingly, the elements come to rest.

The lateral comparator equality signals LP < LT, LP = LT and LP > LT are continuously generated in response to the thumb wheel signals LT1-4 and the lateral position register signals LP1-4. See FIG. 4. The lateral position register 56 provides a continuous indication of the actual lateral position of the elements in response to the lateral direction sensing circuit 52 in combination with the frequency divider 54. Thus, the lateral position register is counted up in response to the LDSU output of the lateral direction sensing circuit and is counted down in response to the LDSD output of the lateral direction sensing circuit.

Figure 5:
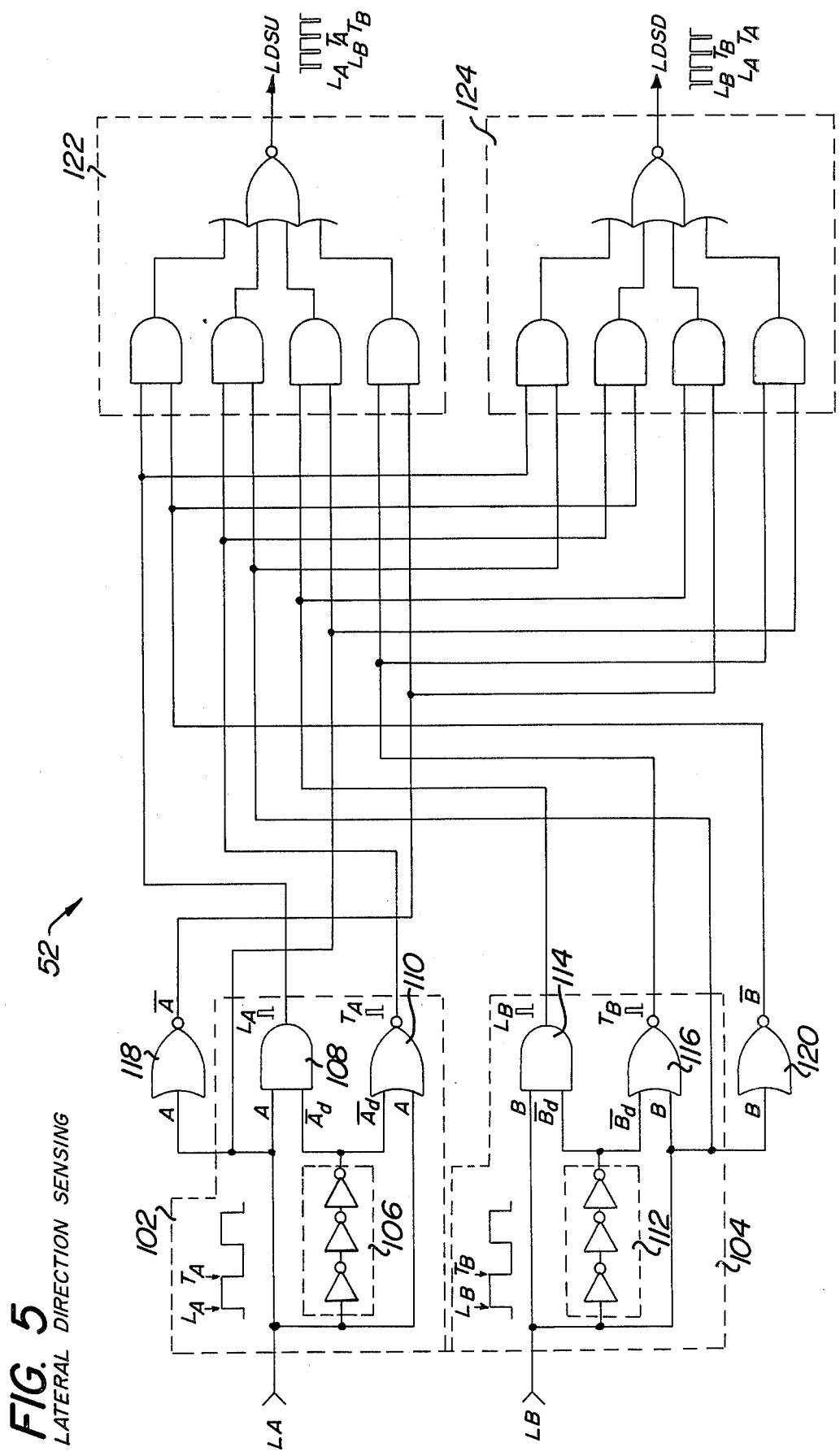
FIG. 5 is a logic diagram of the lateral direction sensing circuit.

The inputs to the lateral direction sensing circuit are the two quadrature phase channel outputs of the lateral receiver 50, designated LA and LB. See FIG. 5. The phase relationship between the LA and LB signals is determined by the direction of rotation of the lead screw motor 61 which in turn determines the direction of lateral displacement of the rotary elements. The direction of lateral displacement of the elements is defined in respect to the position of the fixed yoke 48. See FIG. 1. Motion away from yoke 48 is defined as forward motion. Motion towards yoke 48 is defined as reverse motion. It is preferred that the elements always be brought to rest at the set point position from the reverse direction, as previously described.

The pulse repetition frequencies of the LA and LB outputs of lateral receiver 50 are the same as the frequency of the outputs of encoder 63, namely 500 pulses per revolution of the lead screw for the preferred embodiment described herein. For forward motion of the elements, the LA signal leads the LB signal by 90°. For reverse motion of the elements, the LA signal lags the LB signal by 90°. The lateral direction sensing circuit 52 detects the phase relationship between the LA and LB signals and counts the lateral position register 56 up or down accordingly to provide an accurate indication of the lateral position of the elements.

The lateral direction sensing circuit 52 comprises a pair of edge detection circuits 102 and 104 for detecting the leading and trailing edges of the LA and LB pulses, respectively. See FIG. 5. Edge detection circuit 102 includes an inverter and delay circuit 106 which inverts the LA signal and delays it by approximately 45 ns. An AND gate 108 generates a short pulse at the leading edge of the LA signal, and a NOR gate 110 generates a short pulse at the trailing edge of the LA signal. The pulse outputs of the AND gate and NOR gate are approximately 45 ns duration.

Edge detection circuit 104 is identical to edge detection circuit 102. Edge detection circuit 104 includes an invert and delay circuit 112 which is identical to invert and delay circuit 106. Thus, invert and delay circuit 112 inverts and delays the LB signal by approximately 45 ns. An AND gate 114 generates a short pulse of approximately 45 ns duration at the leading edge of the LB signal and a NOR gate 116 generates a short pulse of approximately 45 ns duration at the trailing edge of the LB signal. The pulse outputs of edge detection circuits 102 and 104 are transmitted, together with the inverted LA and LB signals generated by NOR gates 118 and 120 respectively, to AND-OR-INVERT circuits 122 and 124.

When the LA signal leads the LB signal by 90°, corresponding to forward motion of the elements, the AND-OR-INVERT circuit 122 generates a series of negative going output pulses LDSU having a pulse repetition frequency which is four times the pulse repetition frequency of the LA and LB signals. The LDSU output pulses cause the lateral position register 56 to be counted up.

When the LA signal lags the LB signal by 90°, corresponding to reverse motion of the elements, the AND-OR-INVERT circuit 124 generates a series of negative-going output pulses LDSD having a pulse repetition frequency which is four times the pulse repetition frequencies of the LA and LB signals. The LDSD output pulses cause the lateral position register 56 to be counted down.

It is preferred that five revolutions of the lead screw will produce 1 inch of lateral displacement of the elements. Since the pulse repetition frequencies of the LA and LB signals is 500 pulses per revolution of the lead screw, a frequency divider 54 is interposed between the lateral direction sensing circuit 52 and the lateral position register 56 to obtain an accuracy of 0.01 inches in tracking the actual position of the elements. Thus, the pulse repetition frequencies of the LDSU and LDSD signals will be four times the pulse repetition frequencies of the LA and LB signals, or 2000 pulses per revolution of the lead screw. Accordingly, 10,000 LDSU or LDSD pulses represent 1 inch of lateral displacement of the element in the forward and reverse directions, respectively. The frequency divider 54 provides the pulse repetition frequencies of the LDSU and LDSD pulses by a factor of 100 so that the lateral position register 56 tracks 1 inch of displacement of the elements by counting up or down exactly 100 pulses. Each output of the frequency divider 54 represents a "correction" signal which counts the lateral position register as a function of the corrective displacement of the elements. Each count of the lateral position register represents one hundredth inch of corrosive displacement of the elements.

Each unit of the numerical setting of the thumb wheel switch LT1-4 also represents one hundredth of an inch of lateral displacement. The lateral position register and thumb wheel signals, LP and LT are therefore compared unit for unit by the lateral comparator 60 to generate the LP < LT, LP = LT and LP > LT outputs. Each comparator output represents an "error" signal which determines the direction of corrective displacement of the elements in response to the lead screw motor control circuit 62 as already described An advantage of the invention is that the rotary elements can be moved laterally to the set point position indicated by thumb wheel switch LT1-4 either while the creaser and slotter shafts are stationary or while the shafts are being synchronously driven during operation of the box-making machine. In either case, it is unnecessary to separate the sections of the machine for purposes of obtaining operator access thereto. Moreover, if the shafts are being driven, the machine need not be shut down to permit lateral repositioning of the rotary elements. The invention therefore permits the safe and efficient lateral re-positioning of the rotary elements.

ROTARY AXIS CONTROL

The depth of a slot in box blank 11 is regulated by rotating the associated slotter knife element with respect to the creaser shaft as is well known in the art. See FIG. 1. This is accomplished by operating register motors 65 and 67 which are connected by differential gearing to slotter shafts 12 and 14, respectively. The rotary axis control for each register causes each motor to rotate its associated shaft and position the slotter knife elements thereon so that the desired slot depth is obtained.

The relative positioning of the slotter knife elements on shafts 12 and 14 with respect to the leading and trailing edges of the box blanks, respectively, is indicated by the phase relationship between the slotter and creaser shaft encoders. The slotter and creaser shafts are synchronously driven with the feed section of the machine by a main drive (not shown) as is well known in the art. Each revolution of a slotter shaft corresponds to a box blank being fed in position for slotting at slotter shafts 12 and 14. The rotary position of the slotter knife elements on shafts 12 and 14 at these times determines the depth of the trailing and leading edge slots in the box blanks.

The rotary axis controls for each of the register motors are the same. In describing the rotary axis control herein, reference is made to register motor 65 and the rotary elements on trailing slotter shaft 12. It should be understood, however, that an identical rotary axis control is associated with the leading slotter shaft 14 to control the rotary position of the elements mounted thereon.

Figure 7:
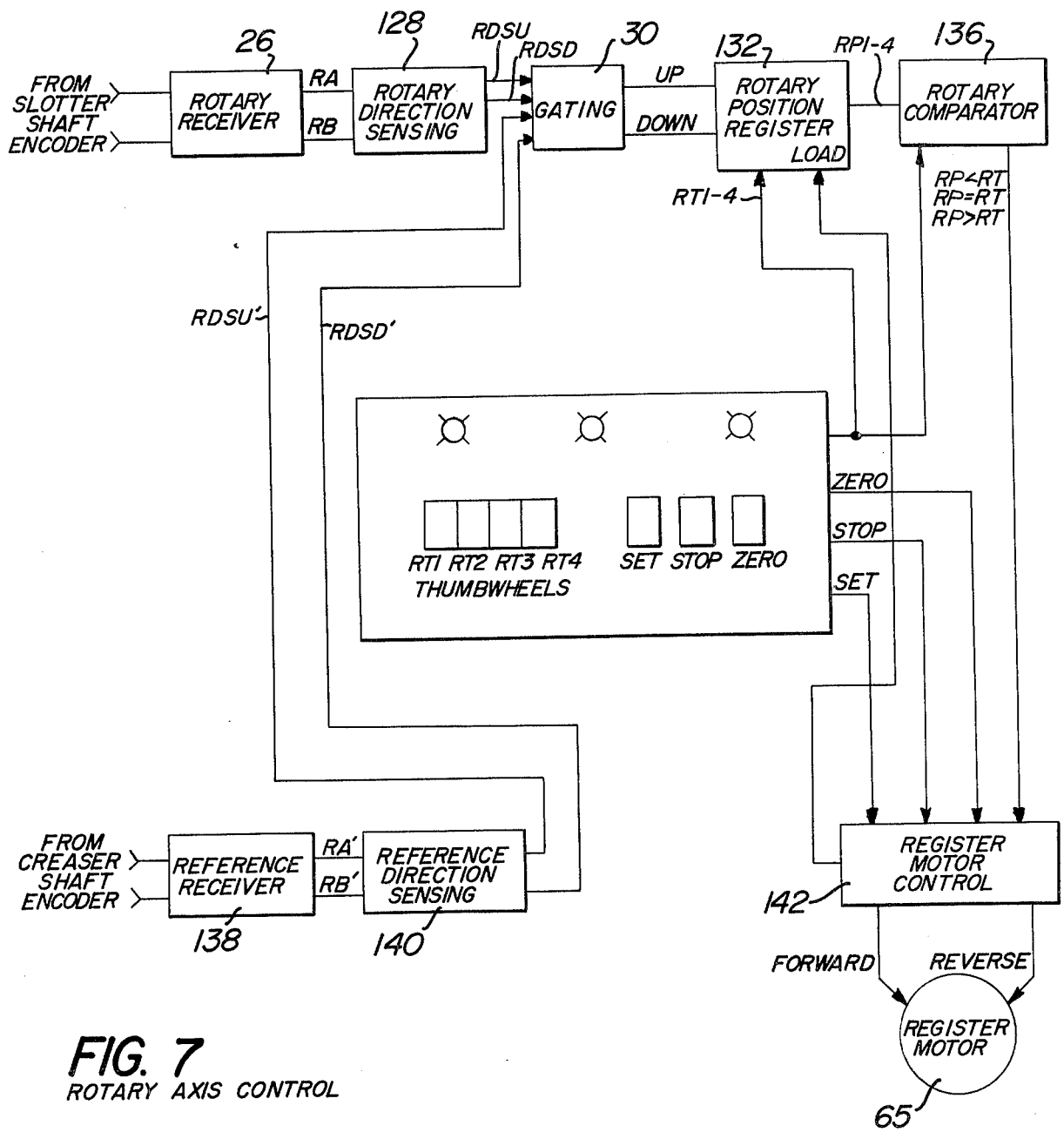
FIG. 7 is a block diagram of the rotary axis control.

The rotary position of the elements on shaft 12 is indicated by encoder 69. See FIG. 1. A rotary receiver 126 detects the quadrature channel outputs of encoder 69. See FIG. 7. Rotary receiver 126 is a differential receiver having two balanced quadrature phase channel inputs. The rotary receiver generates quadrature phase outputs designated RA and RB. The direction of rotation of the slotter shaft is sensed by rotary direction sensing circuit 128. The rotary direction sensing circuit 128 is identical to lateral direction sensing circuit 52, already described. The outputs of the rotary direction sensing circuit are designated RDSU and RDSD.

The RDSU and RDSD outputs are reflected through a gating circuit 130 to a rotary position register 132.

The position of the leading edge of the box blank is indicated by creaser shaft encoder 73. Reference receiver 138 detects the quadrature channel outputs of encoder 73. Reference receiver 138 is a differential receiver having two balanced quadrature phase channel inputs. The reference receiver generates quadrature phase outputs designated RA' and RB'. The direction of rotation of the creaser shaft is sensed by reference direction of sensing circuit 140. The reference direction sensing circuit 140 is identical to rotary direction sensing circuit 128. The outputs of reference direction sensing circuit 140 are designated RDSU' and RDSD'.

The RDSU' and RDSD' signals are reflected through gating circuit 130 to the rotary position register 132. Normally, the creaser shaft rotates in one direction only, in synchronism with the slotter shafts, and only one channel of the reference direction sensing circuit 140, the RDSU' channel, is used. However, if the slotter element is adjusted while all shafts are stationary, including the creaser shaft, the second or RDSD' channel can be used to correct for unwanted drift of the creaser shaft in the opposite direction as will be described more fully below.

The rotary position register 132 is preset to the zero or observed initial position of the slotter knife element on shaft 12 by means of thumb wheel switches RT1-4 on control panel 134. Control panel 134 is identical to control panel 58. The outputs of the rotary position register, designated RP1-4, indicate the relative position of the slotter knife elements with respect to the moving box blank. The outputs of rotary position register 132 are continuously compared to the thumb wheel signals RT1-4 by rotary comparator 136. Equality and inequality of the rotary position register and thumb wheel signals is indicated by the rotary comparator outputs RP < RT, RP = RT and RP > RT (the "rotary comparator equality signals").

A register motor control circuit 142 drives register motor 65 in the forward or reverse directions in response to the rotary comparator equality signals and the operation of the Set, Stop and Zero switches on control panel 134.

Operation of the rotary axis control is described in further detail hereinafter.

The rotary direction sensing circuit 128 and reference direction sensing circuit 140 are identical to the lateral direction sensing circuit 52. See FIG. 5. The RA and RB signals and the RA' and RB' signals are each analogous to the LA and LB signals. See FIGS. 4 and 7. The RDSU and RDSD signals and the RDSU' and RDSD' signals are analogous to the LDSU and LDSD signals. The rotary position register 132 is identical to the lateral position register 56. See FIG. 4. The RP1-4 signals are analogous to the LP1-4 signals. The rotary comparator 136 is functionally equivalent to the lateral comparator 60. The RT1-4 signals are analogous to the LT1-4 signals and the rotary comparator equality signals are analogous to the lateral comparator equality signals. The register motor control circuit 142 is identical to the lead screw motor control circuit 62. The Set, Stop and Zero switches on panel 134 are identical to the Set, Stop and Zero switches on panel 58.

To zero the rotary axis control, the operator sets the thumb wheel switch RT1-4 to the observed initial rotary position of the elements and depresses the Zero pushbutton on control panel 134. See FIG. 7. The Zero pushbutton is a momentary contact switch which is grounded when depressed. This causes the rotary position register 132 to be preset to the thumb wheel switch signals RT1-4. Thereafter, the rotary axis control will operate to maintain the elements at the zeroed position.

If the initial position of the elements is not the desired position, the operator merely manipulates the thumb wheel switch to indicate the desired or set point position and presses the Set pushbutton. The rotary axis control will automatically position the elements at the set point location by causing register motor control 142 to rotate shaft 12.

The register motor control circuit 142 operates in either of two modes rotationally position the elements on shaft 12 depending upon the initial sense of the difference between the initial rotary position of the elements and the set point position indicated by the thumb wheel setting, hereinafter referred to as "initial rotary position error."

If the initial rotary position error is negative, RP will be < RT. See FIG. 7. Accordingly, the RP < RT output of comparator 136 will be "high." In response, the register motor control circuit generates a "low" forward signal to the register motor 65. The motor turns shaft 12 to reposition the elements thereon to the set point position indicated by the thumb wheel setting.

When the slotter elements reach the set point position indicated by the thumb wheel setting, the register motor continues to operate the motor, causing the elements to over-shoot the set point position. As a result, the RP < RT output of comparator 136 goes "low" and the RP < RT output of the comparator goes "high." Accordingly, the register motor control 142 causes the register motor to turn shaft 12 in the reverse direction such that the rotary displacement of the elements reverses, bringing the elements back towards the set point position.

When the elements reach the set point position in the reverse direction, the RP = RT output of comparator 136 goes "high," causing the register motor control 142 to stop the register motor, and the elements remain at the set point position.

If, on the other hand, the initial rotary position error is positive, the element is brought to the set point position without any over-travel. If the initial rotary position error is positive, the RP < RT output of comparator 136 will be "high" when the Set Switch is momentarily depressed. This causes the register motor control 142 to operate the register motor to bring the elements to the set point position without any over-travel. Thus, when the elements reach the set point position, the RP = RT output of comparator 136 causes the register motor control 142 to stop the register motor, and the elements remain at the set point position.

In view of the foregoing, it should be appreciated that the elements are always brought to rest at the set point position from the same rotary direction, regardless of the sense of the initial rotary position error, by selectively driving the register motor in the forward or reverse directions. The effect of backlash in the gearing connecting the register motor to the shaft therefore is kept substantially constant. Similarly, the effect of coasting due to register motor inertia is kept substantially constant.

At any time during correction of the rotary position of the elements on shaft 12, the register motor can be stopped by the operator. This is accomplished by merely depressing the Stop pushbutton on control panel 134. When the Stop pushbutton is depressed, it causes the register motor control circuit 142 to disable the register motor. Accordingly, the elements come to rest.

The rotary comparator equality signals RP < RT, RP = RT and RP > RT are continuously generated in response to the thumb wheel signals RT1-4 and the rotary position register signals RP1-4. The rotary position register 132 provides a continuous indication of the relative position of the elements on shaft 12 with respect to the moving box blank in response to the rotary direction sensing circuit 128 and the reference direction sensing circuit 140 in combination with the gating circuit 130. Thus, the rotary position register 132 is counted up in response to the RDSU or RDSU' signals and is counted down in response to the RDSD or RDSD' signals.

The inputs to the rotary direction sensing circuit 128 are the two quadrature phase channel outputs of the rotary receiver 126, designated RA and RB. See FIG. 7. The phase relationship between the RA and RB signals is determined by the direction of rotary displacement of shaft 12 and the elements thereon. This in turn is a function of the direction of rotation of the register motor 65. The direction of rotary displacement of the elements is defined in respect to the location of the leading edge of the box blank as indicated by creaser shaft 16. Motion of the elements in the direction of driven rotation of shaft 12 is defined as forward motion. Motion opposing the direction of driven rotation is defined as reverse motion.

For forward motion of the elements, the RA signal leads the RB signal by 90°. For reverse motion of the elements, the RA signal lags the RB signal by 90°. The rotary direction sensing circuit 128 detects the phase relationship between the RA and RB signals and counts the rotary position register 132 up or down accordingly to provide an accurate indication of the rotary position of the elements.

When the RA signal leads the RB signal by 90°, corresponding to forward motion of the elements, the rotary direction sensing circuit 28 generates a series of negative going output pulses RDSD. The RDSD pulses also have a pulse repetition frequency which is four times the pulse repetition frequencies of the RA and RB signals. The RDSD output pulses count the rotary position register 132 down.

The rotary position register 132 is also counted up in response to the RDSU' output of the reference direction sensing circuit 140 and is counted down in response to the RDSD' output of the circuit. Each revolution of the slotter shaft indicates that the edge of a box blank is in position at the leading or trailing slotter shafts for slotting by the slotter element knives. Although the creaser and slotter shafts are not driven at the same speeds, the encoders 69, 71 and 73 are connected to their respective shafts so that they move at the same speeds. The pulse repetition frequencies of the RA' and RB' and the RA and RB signals therefore are identical. The RDSU, RDSD and RDSU', RDSD' signals are processed by gating circuit 130 to provide the up and down "correction" signals for incrementing and decrementing, respectively, the rotary position register 132.

The RDSU' signal has a pulse repetition frequency which is four times the pulse repetition frequency of the RA' signal. The RDSU' signal triggers a one-shot 144 in gating circuit 130. See FIG. 8. The one shot enables a synchronizer 146 to pass a Clock C pulse via its complementary output terminal to an AND gate 148. The AND gate 148 transmits the pulse to the Up terminal of the rotary position register 132. Thus, if the creaser shaft is rotating in response to the main drive, the rotary position register 132 is continuously being counted up at the pulse repetition frequency of the RDSU' pulses.

If the slotter shaft is rotating in synchronism with the creaser shaft in response to the main drive, the rotary direction sensing circuit 128 generates the RDSD signal in response to the RB signal from rotary receiver 126. The pulse repetition frequency of the RDSD signal is four times the pulse repetition frequency of the RB signal and therefore is equal to the pulse repetition frequency of the RDSU' signal. The RDSD signal triggers a one shot 150 which enables a synchronizer 152 to pass a Clock A pulse to AND gate 154. The AND gate transmits the pulse to the down terminal of the rotary position register. Accordingly, when the slotter and creaser shafts are rotating in synchronism in response to the main drive, the position register is continuously counted up and down at the same rates so that there will be no net change in the position register reading.

If it is desired to reposition the elements on shaft 12 while the creaser and slotter shafts are rotating in synchronism in response to the main drive, the operator merely changes the thumb wheel setting RT1-4. This causes the rotary comparator 136 to generate the comparator equality signals which act as "error" signals to activate the register motor control 142 to operate register motor 65. The register motor rotates shaft 12 to bring the elements thereon to the new point position. The register motor may rotate shaft 12 either with or against the direction of driven rotation of the shaft. In the initial rotary position error is negative, corresponding to forward motion of the register motor, the register motor rotates the shaft in the same direction as the direction of driven rotation. The rotary direction sensing circuit 128 will generate more RDSD pulses than RDSU' pulses generated by the reference direction sensing circuit 140 per revolution of the creaser and slotter shafts, ultimately causing the rotary position register 132 to be counted down until the elements reach the set point position. At this point, the RT1-4 and RP1-4 signals are the same, the rotary comparator 136 causes register motor control 142 to stop the register motor.

If the initial rotary position error is positive, corresponding to reverse motion of the register motor, the register motor rotates the shaft against the direction rotation. The reference direction sensing circuit 140 will generate more RDSU' pulses than RDSD pulses generated by the rotary direction sensing circuit per revolution of the creaser and slotter shafts, ultimately causing the rotary position register 132 to be counted up.

When the slotter elements reach the set point position, the register motor continues to turn the shaft, causing the elements to overshoot the set point position. As a result, the RP < RT output of comparator 136 goes "high," causing the register motor control circuit 142 to reverse the direction of rotation of the register motor so that there are more RDSD than RDSU' pulses per revolution of the creaser and slotter shafts. The direction of travel of the elements reverses, bringing the elements back towards the set point position while the position register is again counted down.

When the elements reach the set point position, the RP = RT output of comparator 136 goes "high," causing the register motor control to stop the register motor, and the element remains at the set point position.

If it is desired to reposition the elements on shaft 12 while the creaser and slotter shafts are stationary, that is, while the creaser and slotter shafts are not being driven, the operator merely depresses the Set pushbutton on panel 134. If the initial rotary position error is negative, corresponding to forward motion of the register motor, the register motor rotates the slotter shaft in the forward direction, namely, the direction that the slotter shaft would be driven during slotting of a box blank. The rotary direction sensing circuit 128 will generate RDSD pulses while the reference direction sensing circuit 140 generates neither RDSU' nor RDSD' pulses. Accordingly, the rotary position register is counted down until the slotter element reaches the set point position. At this point, the RT1-4 and RP1-4 signals are the same, and rotary comparator 136 causes register motor control 142 to stop the register motor.

If the initial rotary position error is positive, corresponding to reverse motion of the register motor, the register motor rotates the shaft in the reverse direction, namely, the direction against which the shaft would be driven during slotting of a box blank. The rotary direction sensing circuit 128 will generate RDSU pulses while the reference direction sensing circuit 140 generates neither RDSU' nor RDSD' pulses.

The RDSU signal triggers a one shot 156 which enables a synchronizer 158 to pass a Clock A pulse to AND gate 148. The AND gate transmits the pulse to the up terminal of the rotary position register 132. The rotary position register tracks the rotary position of the elements as a function of the RDSU signal. The rotary position register is counted up and the register motor continues to turn the slotter shaft, causing the slotter element to overshoot the thumb wheel setting.

When the slotter element overshoots the set point position, the RP > RT output of comparator 136 goes "high," causing the register motor control circuit 142 to reverse the direction of rotation of the register motor so that the rotary direction sensing circuit begins to generate RDSD pulses. The direction of travel of the elements reverses, bringing the elements back towards the set point position while the position register is counted down.

When the element reaches the set point position, the RP = RT output of comparator 136 goes "high," causing the register motor control to stop the register motor, and the elements remain at the set point position.

Normally, the RDSD' channel of gating circuit 130 is not used since the creaser shaft is either stationary or is driven synchronously with the slotter shafts in the forward direction only. However, while the creaser shaft is stationary, it may drift, producing a rotation in either the forward or reverse directions. Rotation of the creaser shaft in the forward direction would be accounted for by the RDSU' channel of gating circuit 130 as already described. Rotation of the creaser shaft in the reverse direction would be accounted for by the RDSD' channel of the gating circuit.

The RDSD' pulses trigger a one shot 162 which enables a synchronizer 164 to pass a Clock C pulse to AND gate 154 to count the rotary position register down by the amount of displacement of the creaser shaft relative to the slotter shaft. Since the rotary displacement of the creaser shaft indicates displacement of the leading edge of the box blank, the change in rotary position of shaft 12 relative to the box blank will automatically be compensated for.

It can be seen that the purpose of gating circuit 130 is to prevent the coincidence of pulses on the up and down lines to the rotary position register 132. This is accomplished by synchronizing the RDSU' and RDSD' pulses to the Clock C pulses and the RDSU and RDSD pulses to the Clock A pulses. The Clock C and Clock A pulses are generated by a master Clock circuit 160. The Clock A and Clock C pulses have the same pulse repetition frequencies and duty cycles but are offset in phase by at least one pulse width. Accordingly, if an RDSU' signal is generated in coincidence with an RDSD signal, or if a RDSD' signal is generated in coincidence with a RDSU signal, the rotary position register 132 will be able to separate the pulses and accurately track the rotary position of the elements on the slotter shaft.

Although in describing the rotary axis control, reference has been made specifically to trailing slotter shaft 12 which slots the tailing edge of the box blank, it should be apparent that an identical rotary axis control operates in combination with leading slotter shaft 14 in an identical manner to regulate the location and depth of the leading edge slots.

An advantage of the invention is that the rotary elements can be rotated to the set point position indicated by thumb wheel switch RT1-4 either while the creaser and slotter shafts are stationary or while the shafts are being synchronously driven during operation of the box-making machine. In either case, it is unnecessary to separate the sections of the machine for purposes of obtaining operator access thereto. Moreover, if the shafts are being driven, the machine need not be shut down to permit rotary repositioning of the rotary elements. The invention therefore permits the safe and efficient rotary repositioning of the rotary elements.

The present invention may be embodied in other specific forms without departing from the spirit or essential attributes thereof and, accordingly, reference should be made to the appended claims, rather than to the foregoing specification as indicating the scope of the invention.

I claim:

1. Apparatus for processing a moving box blank including a rotatable shaft having a plurality of rotary elements mounted thereon at least one of which is mounted for lateral movement along the longitudinal axis of the shaft in response to rotation of a lead screw operatively associated with the element by a lead screw motor, comprising:

means for generating a digital set point signal indicative of a desired lateral position of a rotary element along a rotatable shaft;

means for tracking the actual lateral position of the rotary element on the shaft and for generating a digital signal indicative thereof;

means for comparing said actual position signal to said set point signal and generating an error signal indicative of the sense of the difference therebetween;

means for causing a lead screw motor to rotate a lead screw and move the movable rotary element along the longitudinal axis of the shaft in a first direction directly to said desired lateral position; and means for sequentially causing the lead screw motor to rotate the lead screw and move the movable rotary element along the longitudinal axis of the shaft in a second direction to and beyond said desired lateral position and to rotate the lead screw and move the movable rotary element along the longitudinal axis of the shaft in said first direction directly to said desired lateral position.

2. Apparatus according to claim 1 wherein said means for tracking the actual position of the element on the shaft includes encoder means for detecting rotation of the lead screw and for generating a pair of digital quadrature phase signals representative thereof, direction sensing means for determining the sense of rotation of the lead screw in response to said digital quadrature phase signals and for generating a correction signal as a function thereof, and position register means for tracking the actual lateral position of the element in response to said correction signal.

3. Apparatus for processing a moving box blank including a rotatable shaft having a plurality of rotary elements mounted thereon at least one of which is mounted for rotary movement with the shaft in response to the rotation of a register motor operatively associated with the shaft, comprising:

means for generating a digital set point signal indicative of a desired rotary position of a movable rotary element on the rotatable shaft;

means for tracking the rotary position of the rotary element on the shaft and for generating a digital signal indicative thereof;

means for comparing said position signal to said set point signal and for generating an error signal indicative of the sense of the difference therebetween;

means for causing a register motor to rotate said shaft with said rotary element thereon to move said rotary element in a first direction directly to said desired rotary position; and means for sequentially causing the register motor to rotate said shaft with said rotary element thereon to move said rotary element in a second direction to and beyond said desired rotary position and to rotate said shaft with said rotary element thereon to move said rotary element in said first direction directly to said desired rotary position.

4. Apparatus according to claim 3 wherein said means for tracking the position of the element on the shaft includes means for generating a digital signal indicative of the location of the box blank relative to the rotary position of the rotary element on the shaft, encoder means for detecting rotation of the shaft and for generating a pair of digital quadrature phase signals representative thereof, direction sensing means for determining the sense of rotation of the shaft in response to said digital quadrature phase signals and for generating a digital signal indicative thereof, gating means for generating a correction signal as a function of said digital signal generated by said direction sensing means and said digital signal indicative of the location of the box blank, and position register means for tracking the rotary position of the element in response to said correction signal.

5. Apparatus for processing a moving box blank including a rotatable shaft having a plurality of rotary elements mounted thereon at least one of which is mounted for rotary movement with the shaft in response to the rotation of a register motor operatively associated with the shaft, comprising:

means for generating a digital set point signal indicative of a desired rotary position of a movable rotary element on a rotatable shaft.

means for tracking the rotary position of the rotary element on the shaft and for generating a digital signal indicative thereof;

means for comparing said position signal to said set point signal and for generating an error signal indicative of the sense of the difference therebetween; and means for causing a register motor to rotate said shaft with said rotary element thereon to move said rotary element to said desired rotary position in response to said error signal.

6. Apparatus for processing a moving box blank including a rotatable shaft having a plurality of rotary elements mounted thereon at least one of which is mounted for lateral movement along the longitudinal axis of the shaft in response to rotation of a lead screw operatively associated with the element by a lead screw motor and for rotary movement with the shaft in response to rotation of a register motor operatively associated with the shaft, comprising:

means for generating a digital lateral set point signal indicative of a desired lateral position of a rotary element on a rotatable shaft;

means for generating a digital rotary set point signal indicative of a desired rotary position of the rotary element on the shaft;

means for tracking the lateral position of the rotary element on the shaft and for generating a digital signal indicative thereof;

means for tracking the rotary position of the rotary element on the shaft and for generating a digital signal indicative thereof;

means for comparing said actual lateral position signal to said set point lateral position signal and for generating a lateral error signal indicative of the sense of the difference therebetween;

means for comparing said actual rotary position signal to said point rotary position signal and for generating a rotary error signal indicative of the sense of the difference therebetween;

means for causing the lead screw motor to rotate a lead screw and move the rotary element along the longitudinal axis of the shaft in a first direction directly to said desired lateral position;

means for sequentially causing the lead screw motor to rotate the lead screw and move the rotary element along the longitudinal axis of the shaft in a second direction to and beyond said desired lateral position and to rotate the lead screw and move the movable rotary element along the longitudinal axis of the shaft in said first direction directly to said desired lateral position;

means for causing a register motor to rotate said shaft with said rotary element thereon to move said rotary element in a first direction directly to said desired rotary position; and means for sequentially causing the register motor to rotate said shaft with said rotary element thereon to move said rotary element in a second direction to and beyond said desired rotary position and to rotate said shaft with said rotary element thereon to move said rotary element in said first direction directly to said desired rotary position.

7. Apparatus according to claim 6 wherein said means for tracking the actual lateral position of the element of the shaft includes encoder means for detecting rotation of the lead screw and for generating a pair of digital quadrature phase signals representative thereof, direction sensing means for determining the sense of rotation of the lead screw in response to said digital quadrature phase signal and for generating a lateral correction signal as a function thereof, and register means for tracking the actual lateral position of the element in response to said lateral correction signal.

8. Apparatus according to claim 6 wherein said means for tracking the actual rotary position of the element on the shaft includes means for generating a digital signal indicative of the location of the box blank relative to the rotary position of the rotary element on the shaft, encoder means for detecting rotation of the shaft and for generating a pair of digital quadrature phase signals representative thereof, direction sensing means for determining the sense of rotation of the shaft in response to said digital quadrature phase signals and for generating a digital signal indicative thereof, gating means for generating a correction signal as a function of said digital signal indicative of a location of the box blank and said digital signal indicative of the sense of rotation of the shaft, and register means for tracking the actual rotary position of the element to said correction signal.

* * * * *